United States Patent [19]

Gebregiorgis

[11] Patent Number: 5,324,756

[45] Date of Patent: Jun. 28, 1994

[54] PIGMENT DISPERSANT FOR CATHODIC ELECTROCOATING COMPOSITIONS

[75] Inventor: Taddesse Gebregiorgis, Sterling Heights, Mich.

[73] Assignee: E. I. Du Pont de Nemours and Company, Wilmington, Del.

[21] Appl. No.: 57,036

[22] Filed: May 5, 1993

[51] Int. Cl.$^5$ .................. C08K 3/20; C08L 63/02
[52] U.S. Cl. .................. 523/404; 204/181.7
[58] Field of Search ............ 523/404; 204/181.7

[56] References Cited

U.S. PATENT DOCUMENTS

| | | | |
|---|---|---|---|
| 4,144,159 | 3/1979 | Bosso et al. | 204/181 C |
| 4,429,095 | 1/1984 | Sandri et al. | 526/263 |
| 4,632,957 | 12/1986 | Welsh et al. | 524/548 |
| 4,855,394 | 8/1989 | Goeckel et al. | 528/263 |
| 4,946,507 | 8/1990 | Peng et al. | 523/400 |
| 5,066,688 | 11/1991 | Chung et al. | 523/415 |
| 5,098,949 | 3/1992 | Sakamoto et al. | 524/560 |
| 5,116,903 | 5/1992 | Gebregiorgis | 524/589 |
| 5,128,393 | 7/1992 | Peng et al. | 523/402 |

FOREIGN PATENT DOCUMENTS 0377337  7/1990  European Pat. Off. .

Primary Examiner—Melvyn I. Marquis
Assistant Examiner—David Aylward
Attorney, Agent, or Firm—Hilmar L. Fricke

[57] ABSTRACT

A pigment dispersant that is useful in a cathodic electrocoating composition is prepared by bringing into contact the following compounds: a cyclic alkylene urea amine, a polyepoxide and a dialkanol amine; this pigment dispersant has an advantage of allowing for the high pigment to binder ratios and minimizes the volatile organic content (VOC) in the electrocoating composition.

9 Claims, No Drawings

PIGMENT DISPERSANT FOR CATHODIC ELECTROCOATING COMPOSITIONS

BACKGROUND OF THE INVENTION

This invention is related to a pigment dispersant this is useful in a cathodic electrocoating composition.

The coating of electrically conductive substrates by an electrodeposition process (also called an electrocoating process) is a well known and important industrial process. Electrodeposition of primers to automotive substrates is widely used in the automotive industry. In this process an autobody or an auto part, is immersed in a bath of an electrocoating composition containing an aqueous emulsion of film forming polymer and acts as an electrode in the electrodeposition process. An electric current is passed between the article and a counter-electrode in electrical contact with the aqueous emulsion until a desired thickness of coating is deposited on the article. In a cathodic electrocoating process, the article to be coated is the cathode and the counter-electrode is the anode.

Resin compositions used in the bath of a typical cathodic electrodeposition process also are well known in the art. These resins typically are made from a polyepoxide which has been chain extended and then an adduct is formed to include amine groups in the resin. Amine groups typically are introduced through reaction of the resin with an amine compound. These resins are blended with a crosslinking agent and then neutralized with an acid to form a water emulsion which is usually referred to as a principal emulsion.

The principal emulsion is combined with a pigment paste, coalescent solvents, water, and other additives to form the electrocoating bath. The electrocoating bath is placed in an insulated tank containing the anode. The article to be coated is the cathode and is passed through the tank containing the electrodeposition bath. The thickness of the coatings that is deposited on the article being electrocoated is a function of the bath characteristics, the electrical operating characteristics, the immersion time, and the like.

The resulting coated article is removed from the bath after a set period of time and is rinsed with deionized water. The coating on the article is cured typically in an oven at a sufficient temperature to produce a crosslinked finish on the article.

Cathodic electrocoating compositions, resin compositions, coating baths, and cathodic electrodeposition processes are disclosed in Jerabek et al U.S. Pat. No. 3,922,253 issued Nov. 25, 1975; Wismer et al. U.S. Pat No. 4,419,467 issued Dec. 6, 1983; Belanger U.S. Pat No. 4,137,140 issued Jan. 30, 1979 and Wismer et al. U.S. Pat No. 4,468,307 issued Aug. 25, 1984.

Pigments are a necessary component in a typical electrocoating automotive primer composition. Pigment dispersants are used to disperse the pigment in the composition and keep the pigment dispersed in the composition and thus are a very important part of any electrocoating composition. Useful pigment dispersants for cathodic electrocoating compositions are disclosed in Gebregiorgis et al. U.S. Pat. No. 5,128,393 issued Jul. 7, 1992, Gebregiorgis et al. U.S. Pat. No. 4,946,507 issued Aug. 7, 1990 and Gebregiorgis U.S. Pat. No. 5,116,903 issued May 26, 1992.

In the process for forming pigment dispersions for cathodic electrocoating compositions, primary pigment particles are separated from agglomerates or aggregates of these particles; accluded air and absorbed water are displaced and the surface of the pigment is coated with the pigment dispersant. Ideally, each primary particle which has been mechanically separated during the dispersion process, also is stabilized against flocculation. If the pigment particles are not properly dispersed and stabilized in the composition, the advantages built into the pigment by the manufacturer may be lost. For example, the pigment may settle in the electrodeposition bath which can result in loss of corrosion protection of the substrate. In addition, appearance of a film deposited by the electrodeposition process and the operating characteristics of an electrocoating bath may be adversely affected by inadequate pigment dispersion. The better the pigment dispersant used in a coating composition or electrocoating bath, the less dispersant is required and the pigment to binder ratio can be increased in the composition. This can result in a savings on dispersant costs, improved processability, and a lower VOC (Volatile Organic Content) of the electrocoating bath.

SUMMARY OF THE INVENTION

A pigment dispersant that is useful in a cathodic electrocoating composition is prepared by bringing into contact the following compounds: a cyclic alkylene urea amine, a polyepoxide and a dialkanol amine.

An electrocoating composition containing the pigment dispersant also is part of this invention.

DETAILED DESCRIPTION OF THE INVENTION

By using the novel pigment dispersant in coating compositions and in particular in electrocoating compositions, higher pigment to binder weight ratios can be used in the composition. With the novel pigment dispersant, the pigment to binder ratio can be increased to 12:1 which is a surprisingly unexpected four fold improvement over current commercial dispersants in which the pigment to binder ratio is about 3:1. In addition, the use of the novel pigment dispersant allows for the elimination of solvents in the coating compositions which heretofore conventionally have been used. The pigment dispersant does not contain an onium salt group which can break down during the grinding process used to form the pigment dispersions.

In addition to the above, the novel pigment dispersant has the following advantages: (1) it is water dispersible when reacted with an organic acid, (2) it has a low viscosity, (3) it has excellent mechanical stability and will not break down in a typical pigment dispersion process or in an electrocoating bath, (4) it forms coatings with very good corrosion resistance, excellent chip resistance and (5) the electrocoat bath has improved throwing power.

The novel pigment dispersant is not only useable in electrocoating compositions but is potentially usable in a variety of different coatings such as coatings applied by spraying, roller coating, dip coating, electrostatic spraying and the like. The pigment dispersant has been primarily developed for cathodic electrocoating applications and the remainder of the specification will be directed to these applications but this should not be interpreted to limit the scope of other potential applications for the novel pigment dispersant.

The pigment dispersant is the reaction product of a cyclic alkylene urea amine, a polyepoxide such as an epoxy hydroxy polyether resin and a dialkanol amine.

The constituents are blended together usually in the presence of a solvent and heated to about 75°–150° C. until the epoxide equivalent weight approaches infinity. To form a water dispersible product the product is reacted with an organic acid such as lactic acid, acetic acid and formic acid.

Typically useful cyclic alkylene urea amines are cyclic ethylene urea amine, cyclic propylene urea amine, cyclic methylene urea amine and the like.

Typically useful epoxy hydroxy polyether resins are epoxy resins of diglicidyl ether and Bisphenol A such as Epon ® 828, Epon ® 1001 and Epon ® 1002 F having epoxy equivalent weights of 188, 500 and 650 respectively. Other useful epoxy resins include aliphatic epoxides and epoxidized alkoxylated styrenated phenols.

Typically useful dialkanol amines are dimethanol amine, dimethanol amine, dipropanol amine, methanol ethanol amine, dibutanol amine and the like.

The pigment dispersant has the following formula:

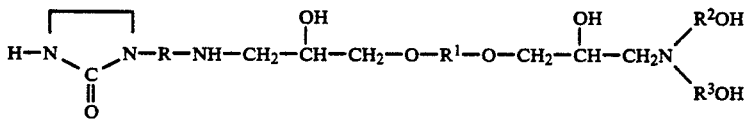

$R^1$ is an aromatic or cycloaliphatic group and $R^2$ and $R^3$ are individual alkylene groups having 1–4 carbon atoms.

The pigment dispersant is used to form a pigment paste which is blended with the principal emulsion, coalescing solvents, water and other additives to form an electrocoating composition. The pigment paste is prepared by grinding or dispersing a pigment in the pigment dispersant; optional ingredients such as wetting agents, surfactants, and defoamers are added. The additive can be added to the paste. After grinding, the particle size of the pigment should be as small as practical, generally, the particle size is about 6–8 determined by using a Hegman grinding gauge. The pigment dispersant generally is used in amounts of about 1–15% by weight, based on the weight of the binder of the electrocoating composition.

Pigments that are used include titanium dioxide, carbon black, iron oxide, clay and the like. Pigments with high surface areas and oil absorbencies should be used judiciously because these can have an undesirable affect on coalescence and flow of the electrodeposited coating.

Most principal emulsions used in the electrocoating composition which are the binder of the composition comprise an aqueous emulsion of an epoxy amine adduct blended with a cross-linking agent and which has been neutralized with an acid to form a water soluble product. Generally, a metal catalyst is added to a blend of the epoxy amine adduct and crosslinking agent.

Useful epoxy amine adducts are generally disclosed in U.S. Pat. No. 4,419,467 which is incorporated herein by reference.

Preferred crosslinking agents are also well known in the prior art and are aliphatic, cycloaliphatic and aromatic isocyanates such as hexamethylene diisocyanate, cyclohexamethylene diisocyanate, toluene diisocyanates, methylene diphenyl diisocyanate and the like. These isocyanates are prereacted with a blocking agent such as oximes, alcohols, or caprolactams which block the isocyanate functionality, i.e., the crosslinking functionality. Upon heating the blocking agents separate, thereby providing a reactive isocyanate group and crosslinking occurs. Isocyanate crosslinkers and blocking agents are well known in the prior art and also are disclosed in the aforementioned U.S. Pat. No. 4,419,467.

The cathodic binder resin of the epoxy amine adduct and the blocked isocyanate are the principal resinous ingredients in the electrocoating composition and are usually present in amounts of about 40 to 60 percent by weight of epoxy amine adduct and 60 to 40 percent by weight of blocked isocyanate.

The electrocoating composition can contain optional ingredients such as wetting agents, surfactants, defoamers and the like. Examples of surfactants and wetting agents include alkyl imidazolines such as those available from Ciba-Geigy Industrial Chemicals as "Amine C", acetylenic alcohols available from Air Products and Chemicals as "Surfynol 104". These optional ingredients, when present, constitute from about 0.1 to 2.0 percent by weight of binder solids of the composition.

Optionally, plasticizers can be used to promote flow. Examples of useful plasticizers are high boiling water immiscible materials such as ethylene or propylene oxide adducts of nonyl phenols of bisphenol A. Plasticizers are usually used at levels of about 0.1 to 15 percent by weight binder solids.

The electrocoating composition is an aqueous dispersion. The term "dispersion" as used within the context of this invention is believed to be a two-phase translucent or opaque aqueous resinous binder system in which the binder is in the dispersed phase and water the continuous phase. The average particle size diameter of the binder phase is about 0.1 to 10 microns, preferably, less than 5 microns. The concentration of the binder in the aqueous medium in general is not critical, but ordinarily the major portion of the aqueous dispersion is water. The aqueous dispersion usually contains from about 3 to 50 percent preferably 5 to 40 percent by weight binder solids. Aqueous binder concentrates which are to be further diluted with water when added to an electrocoating bath, generally have a range of binder solids of 10 to 30 percent weight.

Besides water, the aqueous medium generally contains a coalescing solvent or solvents. Useful coalescing solvents include hydrocarbons, alcohols, polyols and ketones. The preferred coalescing solvents include alcohols, polyols and ketones. Specific coalescing solvents include monobutyl and monohexyl ethers of ethylene glycol, and phenyl ether of propylene glycol. The amount of coalescing solvent is not unduly critical and is generally between about 0.1 to 15 percent by weight, preferably about 0.5 to 5 percent by weight based on total weight of the binder solids.

The following examples illustrate the invention. All parts and percentages unless otherwise indicated are by weight. The examples disclose the preparation of the novel pigment dispersant, a pigment paste made from the dispersant and a cathodic electrocoat bath made from the pigment paste and a typical binder resin.

The binder used in the electrocoating bath is a basic amine epoxy adduct blended with a blocked isocyanate crosslinker and neutralized with an acid. These cathodic electrodepositable binder resins are well known in the prior art. The particular binder used in this example is disclosed in Example 3 of U.S. Pat. No. 4,419,467 and will be referred to hereafter as the '467 binder resin.

EXAMPLE

Preparation of pigment dispersant resin: Neutralized polyepoxide/diethanol amine/cyclic ethylene urea amine adduct.

This neutralized adduct was prepared by charging the following ingredients into a reactive vessel equipped with a mixer, heating source and a nitrogen sprayer:

| Ingredients | Grams | Solids |
|---|---|---|
| Epon ® 828 epoxy resin of a diglycidyl ether of Bisphenol A having an equivalent weight of about 188 from Shell Chemical Company | 400.0 | 400.0 |
| Diethanol amine | 111.7 | 111.7 |
| Ethylene glycol monobutyl ether | 128.0 | |
| Cyclic ethylene urea amine | 140.8 | 140.8 |
| 88% Aqueous Lactic Acid Solution | 217.5 | 191.5 |
| Deionized Water | 1413.0 | |
| | 2411.0 | 844.0 |

The Epon ® 828, diethenol amine and ethylene glycol monobutyl ether were charged into a reaction vessel and heated with a nitrogen sparge to 66° C. to initiate an exotherm with a peak temperature of 99° C. The reaction mixture was held at 99° C. for 30 minutes. The temperature was cooled to 66° C. and then the cyclic ethylene urea amine was added. An exothermic reaction raised the temperature to 99° C. The reaction mixture was held at 99° C. until an epoxy equivalent weight approaching infinity was obtained. The reaction mixture had an amine equivalent weight of 412 (theoretical amine equivalent weight of 411). To this reaction mixture, a solution of 88% lactic acid solution and deionized water were added and mixed for 10-15 minutes to disperse the resin. The resulting pigment dispersant resin dispersion had a resin solids content of 35%.

Preparation of the pigment paste from the pigment dispersant.

A pigment paste using the pigment dispersant resin prepared above was prepared as follows:

| Ingredients | Grams | Solids |
|---|---|---|
| Pigment Dispersant Resin Dispersion (prepared above) | 238.0 | 83.3 |
| Clay pigment | 54.2 | 54.2 |
| Lead Silicate pigment | 62.5 | 62.5 |
| Titanium dioxide pigment | 258.4 | 258.4 |
| Carbon black pigment | 8.3 | 8.3 |
| Dibutyl Tin Oxide | 33.3 | 33.3 |
| Deionized Water | 345.3 | |
| | 1000.0 | 500.0 |

The above ingredients were ground in zirconium media to a Hegman No. 7 to 7.5. The resulting paste had a 50% solids content, a pH of 7.13, and a pigment to binder ratio of 5:1.

Preparation of an electrocoating composition from pigment paste.

A cationic electrodeposition bath was prepared as follows:

| Ingredients | Grams | Solids |
|---|---|---|
| '467 binder resin | 1737 | 608 |
| Pigment Paste (prepared above) | 384 | 192 |
| Deionized Water | 1879 | |
| | 4000.00 | 800.00 |

To the 1737 grams of '467 binder resin, 1879 grams deionized water was added with mixing followed by 384 grams of the pigment paste. This electrodeposition bath had a pH of 6-6.5, had a solids content of 20% and a pigment to binder ratio of 0.25/1.0. Phosphated panels were coated at 280 volts for 135 seconds at a bath temperature of 30° C. The wet film was baked at 162° C. for 30 minutes to form a dry, smooth film having a film thickness of 2.0-30 microns. The cured film withstood 200 methylethyl ketone (MEK) double Rubs. Also, the cured film was scribed and the 20 cycle corrosion performance test results were excellent.

COMPARATIVE EXAMPLE

Preparation of polyepoxide-cyclic ethylene urea amine adduct.

An Epon ® 828/cyclic ethylene urea amine adduct was prepared from the following ingredients.

| Ingredients | Grams | Solids |
|---|---|---|
| Epon ® 828 (prepared above) | 387 | 387 |
| Cyclic ethylene urea amine | 260 | 260 |
| Ethylene glycol monobutyl ether | 162 | |
| | 809 | 647 |

The Epon ® 828, cyclic ethylene urea amine and ethylene glycol monobutyl ether were charged to a reaction vessel described above and heated with a nitrogen sponge to about 66° C. to initiate an exothermic reaction having a peak temperature of about 93° C. The reaction mixture was held at 90° C. until an epoxy equivalent weight approaching infinity was obtained. The theoretical amine equivalent weight of this adduct (80% solids) was 405.

Neutralization of polyepoxide-cyclic ethylene urea amine adduct.

500 grams of the above adduct and 126 grams of an aqueous solution of 88% lactic acid were charged to a reaction vessel and mixed for 10-15 minutes. Then, 1074 grams of deionized water were added to disperse the adduct. A neutralized pigment dispersant resin dispersion was formed having a 30% solids content.

Preparation of the pigment paste from the neutralized pigment dispersant.

A pigment paste using the above neutralized pigment dispersant resin was prepared as follows:

| Ingredients | Grams | Solids |
|---|---|---|
| Pigment Dispersant Resin Dispersion (prepared above) | 277.7 | 83.3 |
| Clay pigment | 54.2 | 54.2 |
| Lead Silicate pigment | 62.5 | 62.5 |
| Titanium dioxide pigment | 258.4 | 258.4 |
| Carbon black pigment | 8.3 | 8.3 |
| Dibutyl tin oxide | 33.3 | 33.3 |
| Deionized water | 305.6 | |
| | 1000.00 | 500 |

The above ingredients were ground in zirconium media to a Hegman No. 7 to 7.5. The resulting paste had a 50% solids content and a pigment to binder ratio of 5:1.

Preparation of an electrocoating composition from the pigment paste.

A cationic electrodeposition bath was prepared as follows:

| Ingredients | Grams | Solids |
|---|---|---|
| '467 binder resin | 1737 | 608 |
| Pigment Paste (prepared above) | 384 | 192 |
| Deionized Water | 1879 | |
| | 4000.00 | 800.00 |

The deionized water was added with mixing to the '467 binder resin and was followed by the addition of the pigment paste. The resulting bath had a pH of 6.0–6.5, a solids content of 20% and a pigment to binder ration of 0.25/100.

Phosphated steel panels were electrocoated in this bath at 250 volts for 135 seconds at a bath temperature of 30° C. The wet films were baked at 162° C. for 30 minutes to produce dry, smooth films having a film thickness for 25–30 microns. The cured film withstood only 200 double rubs with methyethyl ketone.

I claim:

1. A pigment dispersant that is useful in a cathodic electrocoating composition, being prepared by bringing into contact compound (i), a cyclic alkylene urea amine, compound (ii), a polyepoxide and compound (iii), a dialkanol amine.

2. The pigment dispersant of claim 1 in which the compound (i), (ii) and (iii) are reacted in a stoichemetrical amount so that there is no excess of any of the compounds.

3. The pigment dispersant of claim 2 in which the cyclic alkylene urea amine is cyclic ethylene urea amine.

4. The pigment dispersant of claim 2 in which the polyepoxide is a diepoxide of epichlorohydrin and bisphenol A.

5. The pigment dispersant of claim 2 in which the dialkanol amine is dimethanol amine.

6. The pigment dispersant of claim 2 in which the cyclic alkylene urea amine is cyclic ethylene urea amine, the polyepoxide is a diepoxide of epichlorohydrin and bisphenol A and the dialkanol amine is dimethanol amine.

7. A pigment dispersant having the following formula:

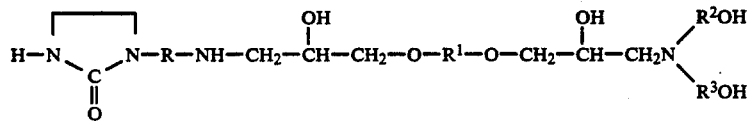

in which R is an aliphatic group having 1–3 carbon atoms and $R^1$ is an aromatic or cycloaliphatic group and $R^2$ and $R^3$ are individual alkylene groups having 1–4 carbon atoms.

8. The pigment dispersant of claim 7 in which

R is $(CH_2)_2$,

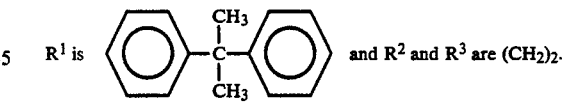

$R^1$ is and $R^2$ and $R^3$ are $(CH_2)_2$.

9. A cathodic electrocoating composition containing about 1–15% by weight, based on the weight of the binder of the composition, of the dispersant of claim 1.

* * * * *